(12) United States Patent
Fornara

(10) Patent No.: US 10,895,856 B2
(45) Date of Patent: Jan. 19, 2021

(54) DEVICE AND METHOD FOR SWITCHING AN ELECTRICAL SYSTEM INTO STANDBY MODE

(71) Applicant: STMicroelectronics (Rousset) SAS, Rousset (FR)

(72) Inventor: Pascal Fornara, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 158 days.

(21) Appl. No.: 16/155,355

(22) Filed: Oct. 9, 2018

(65) Prior Publication Data
US 2019/0113897 A1    Apr. 18, 2019

(30) Foreign Application Priority Data

Oct. 12, 2017  (FR) ...................................... 17 59564

(51) Int. Cl.
*G05B 19/042* (2006.01)
*G04G 19/12* (2006.01)
(Continued)

(52) U.S. Cl.
CPC ........... *G05B 19/042* (2013.01); *G04G 19/10* (2013.01); *G04G 19/12* (2013.01); *H02J 7/00* (2013.01); *H02J 9/005* (2013.01); *H04W 52/028* (2013.01); *H04W 52/0209* (2013.01); *G05B 2219/25257* (2013.01); *H02J 7/345* (2013.01); *H04L 67/12* (2013.01)

(58) Field of Classification Search
CPC . G05B 19/042; H02J 7/00; H02J 7/025; H02J 7/0052; H02J 7/345; G11C 11/34; H02M 3/07

USPC ...................... 307/11, 43, 66, 64, 80, 38, 82
See application file for complete search history.

(56) References Cited

U.S. PATENT DOCUMENTS

RE42,066 E  *  1/2011  Svensson ................ H02M 3/07
                                                                          363/60
8,675,411 B2 *  3/2014  Giaquinta ................ G11C 5/14
                                                                        365/185.18
(Continued)

OTHER PUBLICATIONS

INPI Search Report and Written Opinion for FR 1759564 dated Jul. 25, 2018 (8 pages).

*Primary Examiner* — Rexford N Barnie
*Assistant Examiner* — Jagdeep S Dhillon
(74) *Attorney, Agent, or Firm* — Crowe & Dunlevy

(57) ABSTRACT

A system, supplied by a power supply, is switched into standby mode by an electronic device that includes a charging input coupled to a charge voltage obtained from the voltage delivered by the power supply. A first input is coupled to the power supply and a power supply output is coupled to the system. A storage capacitive element is coupled to the charging input and configured to be charged by the charge voltage. A switching circuit, coupled between the first input and the power supply output, disconnects the power supply output from the first input when the voltage across the terminals of the storage capacitive element is higher than a threshold. A discharge circuit discharges the storage capacitive element so that the capacitor voltage becomes lower than the threshold. The switching circuit further re-connects the first input to the power supply output at the end of the discharge period.

20 Claims, 3 Drawing Sheets

(51) Int. Cl.
*G04G 19/10* (2006.01)
*H02J 7/00* (2006.01)
*H04L 29/08* (2006.01)
*H04W 52/02* (2009.01)
*H02J 9/00* (2006.01)
*H02J 7/34* (2006.01)

(56) References Cited

U.S. PATENT DOCUMENTS

| | | |
|---|---|---|
| 2010/0011234 A1 | 1/2010 | Malik et al. |
| 2010/0202161 A1 | 8/2010 | Sims et al. |
| 2011/0179292 A1* | 7/2011 | Clegg .................. G06F 1/26 713/300 |
| 2018/0309312 A1* | 10/2018 | King .................. H02J 9/066 |
| 2018/0337767 A1* | 11/2018 | Harrison ............ H04L 9/003 |

* cited by examiner

DEVICE AND METHOD FOR SWITCHING AN ELECTRICAL SYSTEM INTO STANDBY MODE

PRIORITY CLAIM

This application claims the priority benefit of French Application for Patent No. 1759564, filed on Oct. 12, 2017, the content of which is hereby incorporated by reference in its entirety to the maximum extent allowable by law.

TECHNICAL FIELD

Various embodiments and their implementation relate to the standby mode of electronic systems, notably the switching into standby mode at regular intervals of given duration.

Such systems are for example incorporated into connected autonomous wireless systems known by those skilled in the art under the acronym IoT (for "Internet of Things").

FIG. 1 shows one example of an autonomous system SYS1 of the prior art comprising an electrical power source.

The system SYS1 furthermore comprises the electrical power source BATT1, a module for managing the electrical power (PM) 1, a processing unit 2, a radio transmission module (Tx/Rx) 3, an antenna ANT and an operational module 4.

A connection terminal B_BATT1 of the source BATT1 is connected to an input E1 of power management module 1.

A terminal S12 of the power management module 1 is connected to an input terminal E2 of the processing unit 2, and a terminal Ec1 of the power management module 1 is connected to a terminal Sc21 of the processing unit 2.

Terminals S13 and S14 are respectively connected to terminals E3 of radio transmission module 3 and E4 of operational module 4.

A terminal S3 of the transmission module 3 is connected to the antenna ANT.

The processing module 2 furthermore comprises two terminals Sc23 and Sc24 respectively connected to the terminals Ec3 of the transmission module and Ec4 of the operational module.

The electrical power source BATT1 is, for example, a battery incorporated into the system SYS1.

The operational unit 4 comprises, for example, a temperature sensor CT taking a temperature measurement and transmitting the measured value to the processing unit 2 via the terminal Ec4.

During the operational phase of the system SYS1, the processing unit 2 processes the value measured by the sensor CT and transmits the conditioned value to the transmission module 3 via the terminal Sc23. The transmission module 3 processes the information transmitted by the unit 2 and transmits the measured value via the antenna ANT.

The processing unit 2 and the modules 3 and 4 are supplied with electrical power by the module for managing electrical power 1 connected to the source BATT1.

The power management module 1 supplies the processing unit 2 via the terminal S12, the modules 3 and 4 respectively via the terminals S13 and S14.

The power management module 1 is controlled by the unit 2 via the terminal Ec1.

The processing unit 2 is, for example, a microcontroller configured for controlling the power management module 1 and the modules 3 and 4.

In order to reduce the power consumption of the source BATT1, and thus to increase the duration of operation of the system SYS1, a temperature measurement is carried out at regular intervals, for example every minute, and, during the period during which no measurement and no signal transmission by the antenna ANT are carried out, the processing unit 2 controls the power management module 1 in such a manner that the electrical power supply of the modules 3 and 4 is turned off. This is a standby phase of the system SYS1.

The processing unit 2 here comprises a circuit MT for calculating a duration, for example a quartz crystal or an oscillator, in order to control the duration of the standby phase of the modules 3 and 4.

The circuit MT may be outside of the processing unit 2, notably incorporated into the power management module 1.

It is necessary for the processing unit 2 to be powered during the standby phase so that the circuit MT is operating.

As a consequence, the system SYS1 consumes electrical power in standby mode and accordingly reduces the autonomy of the electrical power source.

There exists a need, during standby phases of given duration of an autonomous electrical system alternating at regular intervals with operational phases, for the latter to no longer consume any electrical power.

SUMMARY

According to embodiments and their implementation, the idea is to advantageously use a circuit allowing electrical charges to be retained in a controlled manner for controlling the electrical power supply of an electrical system.

According to one aspect, a method is provided for switching a system supplied by an electrical power source into standby mode comprising:

a) charging a storage capacitive element by a charge voltage obtained from the voltage delivered by the power supply source;

b) disconnecting or decoupling the electrical power supply source from the system when the value of the voltage across the terminals of the storage capacitive element is higher than a threshold lower than the charge voltage, so as to switch the system into standby mode;

c) discharging the storage capacitive element for a discharge period in such a manner that the value of the voltage across the terminals of the storage capacitive element becomes lower than the threshold lower than the charge voltage; and d) re-connecting or re-coupling the electrical power supply source to the system at the end of the discharge period.

Advantageously, the method comprises adjusting the discharge period.

Preferably, the adjusting of the discharge period comprises adjusting the charge voltage.

According to one embodiment, the discharge of the storage capacitive element is carried out via a charge flow capacitive element and the adjusting of the discharge period comprises adjusting the capacitive value of the charge flow capacitive element.

According to another embodiment, the discharge of the storage capacitive element is carried out via a charge flow capacitive element and, in step a) the storage capacitive element is partially discharged through the charge flow capacitive element.

According to yet another embodiment, the method comprises a cyclical execution of the steps a) to d).

According to another aspect, an electronic device is provided, designed for switching a system supplied by an electrical power supply source into standby mode, comprising:

a charging input configured to be connected or coupled to a charge voltage obtained from the voltage delivered by the power supply source;

a first input configured to be connected or coupled to the power supply source;

a power supply output configured to be connected or coupled to the system;

a storage capacitive element connected or coupled to the charging input and configured to be charged by the charge voltage;

a switching circuit connected or coupled between the first input and the power supply output and configured for disconnecting or decoupling the output from the first input when the value of the voltage across the terminals of the capacitive element is higher than a threshold lower than the charge voltage;

a discharge circuit configured to discharge the storage capacitive element for a discharge period in such a manner that the value of the voltage across the terminals of the storage capacitive element becomes lower than the threshold;

wherein the switching circuit is further configured to re-connecting or re-coupling the first input to the power supply output at the end of the discharge period.

According to one embodiment, the discharge circuit comprises a charge flow capacitive element connected or coupled between a first terminal of the storage capacitive element and a ground.

Advantageously, the device further comprises an initialization capacitive element connected or coupled between a first terminal of the storage capacitive element and the charging input.

According to another embodiment, the switching circuit comprises a depletion-mode transistor whose gate is coupled to the first terminal of the storage capacitive element, whose source is coupled to the power supply source and whose drain is coupled to the device output, the threshold being equal to the transistor threshold voltage.

Preferably, the depletion-mode transistor comprises a PMOS transistor.

According to yet another aspect, an electronic circuit is provided comprising an electronic device such as previously defined and a system designed to be supplied by a power supply source, the system being connected or coupled to the device charging input and to the power supply device output.

Advantageously, the circuit comprises an adjustment circuit configured to adjust the discharge period.

Preferably, the circuit comprises an adjustment circuit configured to adjust the capacitive value of the charge flow capacitive element.

According to one embodiment, the circuit further comprises a control circuit configured to cyclically activate the charging of the storage capacitive element.

According to another embodiment, the system is a connected autonomous wireless system.

BRIEF DESCRIPTION OF THE DRAWINGS

Other advantages and features will become apparent upon examining the detailed description of non-limiting embodiments and from the appended drawings in which.

DETAILED DESCRIPTION OF THE DRAWINGS

Figure 1:
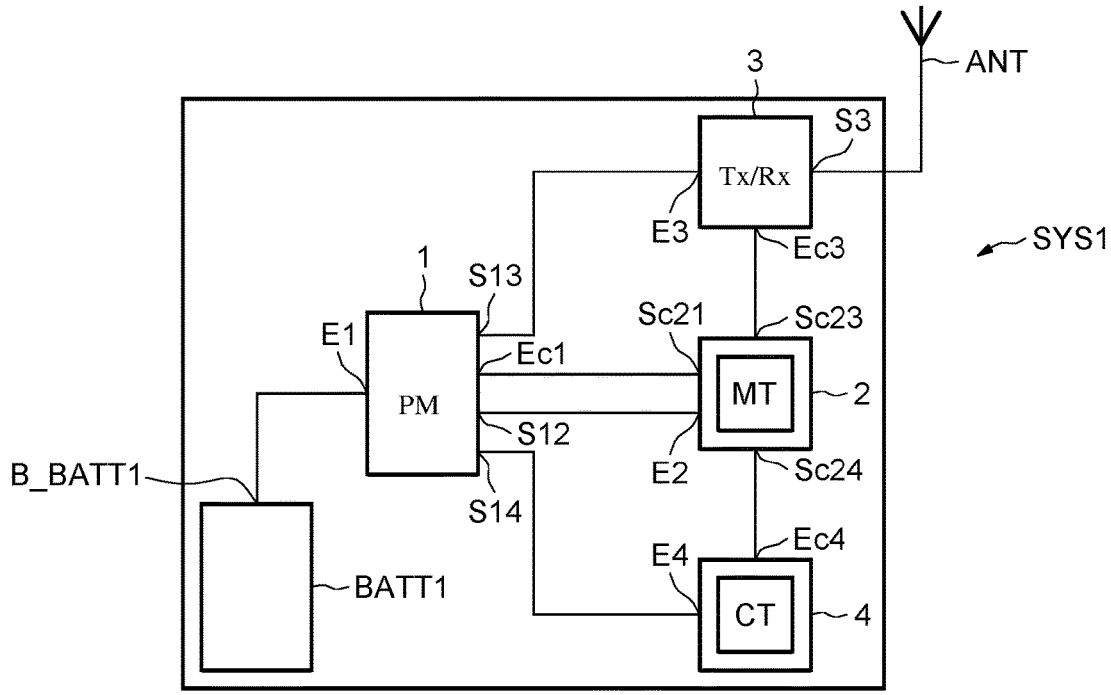
FIG. 1, previously described, illustrates an autonomous wireless system.
Figure 2:
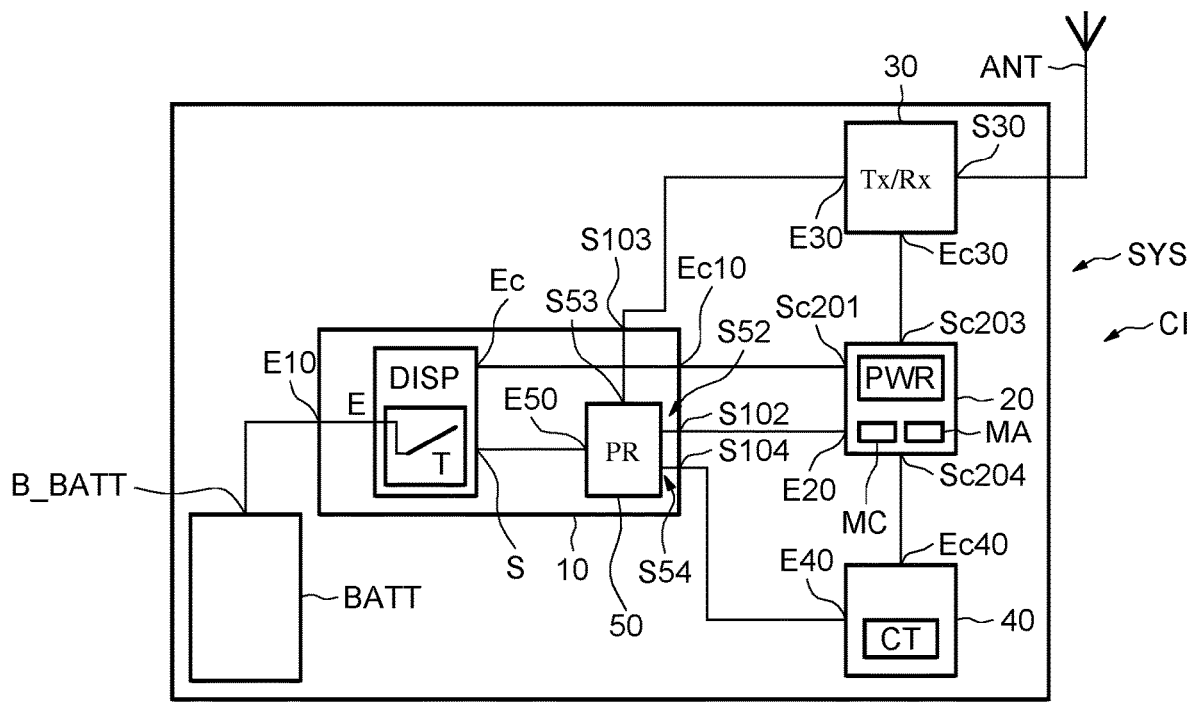
FIG. 2 shows one example of an embodiment of an electrical circuit comprising a system and an electronic device for switching a system into standby mode.

Reference is made to FIG. 2 which shows one example of an embodiment of an electrical circuit CI comprising a system SYS and an electronic device DISP for switching a system SYS into standby mode. Here, the system is a connected autonomous wireless system.

The system SYS comprises an electrical power source BATT, a module for managing the electrical power 10, a processing unit 20, a radio transmission module (Tx/Rx) 30, an antenna ANT and an operational module 40. Here, the electronic device DISP is incorporated into the module for managing the electrical power 10.

A connection terminal B_BATT of the source BATT is connected to a first input E10 of the power management module 10.

The electrical power source BATT supplies the electrical power needed for the operation of the system SYS and is, for example, a battery (LiOn).

A terminal S102 of the power management module 10 is connected to an input terminal E20 of the processing unit 20, and a terminal Ec10 of the power management module 10 is connected to a terminal Sc201 of the processing unit 20.

Terminals S103 and S104 of the power management module 10 are respectively connected to terminals E30 of the radio transmission module 30 and E40 of the operational module 40.

A terminal S30 of the radio transmission module 30 is connected to the antenna ANT.

The antenna ANT receives and emits signals, notably radio signals.

The processing module 20 furthermore comprises two terminals Sc203 and Sc204 respectively connected to the terminals Ec30 of the radio transmission module 30 and Ec40 of the operational module 40 and incorporates an adjustment circuit comprising a power control circuit PWR and a control circuit MC configured for cyclically activating the charging of the storage capacitive element C1.

The operational unit 40 is configured for performing one or more actions. It incorporates, for example, a pressure sensor making a pressure measurement and transmits the measured value to the processing unit 20 via the terminal Ec40.

When the system operates in reception mode, in other words when the antenna ANT receives a signal, the radio transmission module 30 is configured for demodulating the signal received according to techniques well known to those skilled in the art and transmits the information received to the processing unit 20 which is configured for controlling the operational module 40 according to the signal received.

When the system operates in transmission mode, in other words when the antenna ANT emits a signal, the radio transmission module 30 is configured for modulating the signal received from the processing unit 20 configured for processing the data supplied by the operational module 40 according to techniques well known to those skilled in the art.

The power management module 10 is configured for supplying the processing unit 20 and the modules 30 and 40 during the operational phases of the system SYS in reception and transmission mode, and for setting the system SYS into standby mode during the standby phases at regular intervals, for example every 10 seconds.

The power management module 10 here comprises the electronic device DISP and an electrical power repeater (PR) 50 configured for supplying the processing unit 20 and the modules 30 and 40 with electrical power.

The electronic device DISP comprises a first connection terminal E connected to the terminal E10, a second terminal Ec connected to the terminal Ec10 and a power supply terminal S connected to a terminal E50 of the power repeater 50.

The second terminal Ec is a charging input.

The power repeater 50 comprises terminals S52, S53 and S54 respectively connected to the terminals S102, S103 and S104.

The power repeater 50 may, for example, comprise circuitry for adapting the power supply voltage and/or current according to the electrical characteristics of each of the modules 30 and 40 and of the processing unit 20.

The electronic device DISP further comprises a switching circuit T which will allow either the system SYS to be connected to the power supply source BATT for supplying the system, or the system to be disconnected from the power supply source so as to switch it into standby mode.

Figure 3:
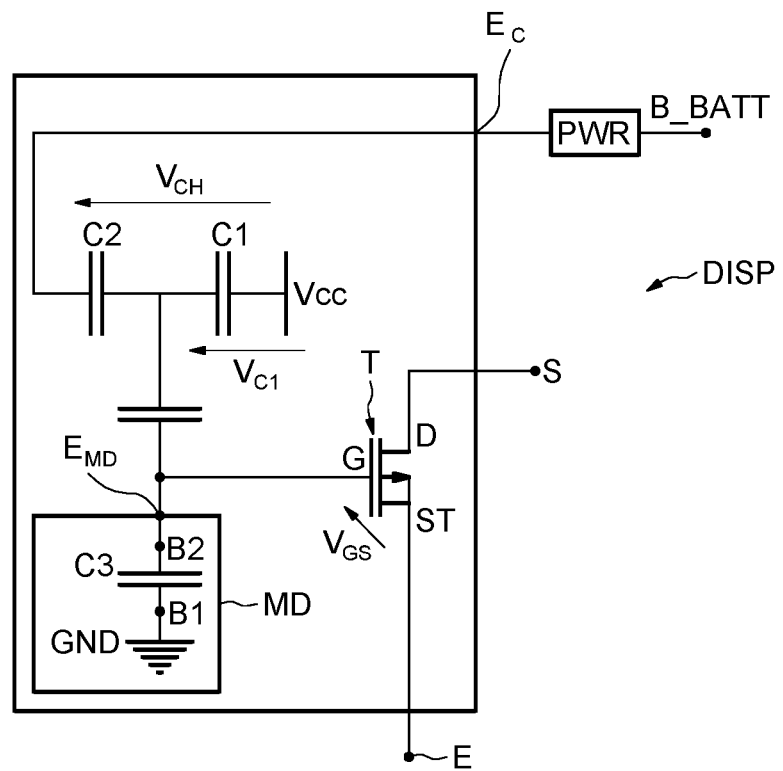
FIG. 3 illustrates one exemplary embodiment of the electronic device.

FIG. 3 illustrates one exemplary embodiment of the electronic device DISP.

The electronic device DISP comprises a discharge circuit MD, a storage capacitive element C1, an initialization capacitive element C2, the switching circuit T and a voltage source Vcc.

A first terminal of the storage capacitive element C1 is coupled, on the one hand, to the charging input Ec via an initialization capacitive element C2, and on the other hand, to an input $E_{MD}$ of the discharge circuit MD.

As a variant, the first terminal of the storage capacitive element C1 could be coupled directly to the charging input Ec.

The charging input Ec is connected to the terminal B_BATT of the power supply source BATT via the control circuit PWR.

The control circuit PWR is configured for controlling the charge voltage $V_{CH}$ of the storage element C1 for a time $T_{CH}$, for example of one second, and are for example incorporated in the form of software into the processing unit 20.

The control circuit PWR can, for example, be implemented using a microcontroller, but may take the form of any device capable of controlling the charge voltage of the element C1.

The unit 20 is further configured for controlling the control circuit PWR.

The processing unit 20 is implemented, for example, using a microcontroller, but may take the form of any device capable of processing the data supplied by the modules 30 and 40, capable of controlling the module 40 and of supplying information to the module 30, and incorporating the control circuit PWR into the embodiment described. This may notably be a microprocessor.

The discharge circuit MD is configured for discharging the storage capacitive element C1 by tunnel effect for a time $T_0$, in the range for example between one minute and twenty-four hours.

The switching circuit T is preferably a depletion-mode PMOS transistor.

Nevertheless, the use of a depletion-mode NMOS transistor would also be possible.

The first terminal of the storage capacitive element C1 is connected to the gate G of the transistor for the switching circuit T.

The transistor for the switching circuit T is conducting when the value of its threshold voltage $V_{GS}$ is lower than a threshold Vthreshold, for example 3 volts. The transistor is turned off when the voltage $V_{GS}$ is higher than the threshold Vthreshold.

The source ST of the transistor for the switching circuit T is connected to the terminal E10 and the drain of the transistor for the switching circuit T is connected to the terminal S.

The switching circuit T is connected between the first input E and the power supply output S and is configured for disconnecting the output S from the first input E when the value of the voltage $V_{C1}$ across the terminals of the element C1 is higher than the threshold Vthreshold.

The switching circuit T is further configured for re-connecting the input E10 to the output S when the voltage $V_{C1}$ across the terminals of the element C1 is lower than the threshold Vthreshold.

A second terminal of the storage capacitive element C1 is connected to a variable voltage source Vcc.

The discharge circuit MD comprises a charge flow capacitive element C3, a first terminal B1 of which is connected to a ground GND and a second terminal B2 of which is connected to the input $E_{MD}$.

The capacitive element C1 has a charge retention capacity greater than that of C3, and the capacitive element C2 has a charge retention capacity greater than that of C3, but less than that of the element C1.

The capacitive elements C1, C2 and C3 form a circuit allowing electrical charges to be retained in a controllable manner for a given time. The capacities of the elements C1, C2 and C3 depend on the implementation technology. By way of example, the capacitance of the storage capacitive element C1 is in the range between 10 and 100 picofarads, the capacity of the initialization capacitive element C2 is in the range between 10 and 100 femtofarads and the capacitance of the charge flow capacitive element C3 is in the range between 1 and 5 femtofarads.

One role of the storage capacitive element C1 is to store electrical charges.

One role of the initialization capacitive element C2 is to allow an injection of charges into the storage capacitive element C1, while avoiding the stresses that would result, for the charge flow element C3, of a direct charging of the storage element C1 by the application of a power supply voltage across its terminals.

One role of the charge flow capacitive element C3 is to discharge the storage element C1 relatively slowly with respect to a direct connection of the element C1 to ground GND. The element C3 is designed to allow charges to flow away via tunnel effect.

Figure 4:
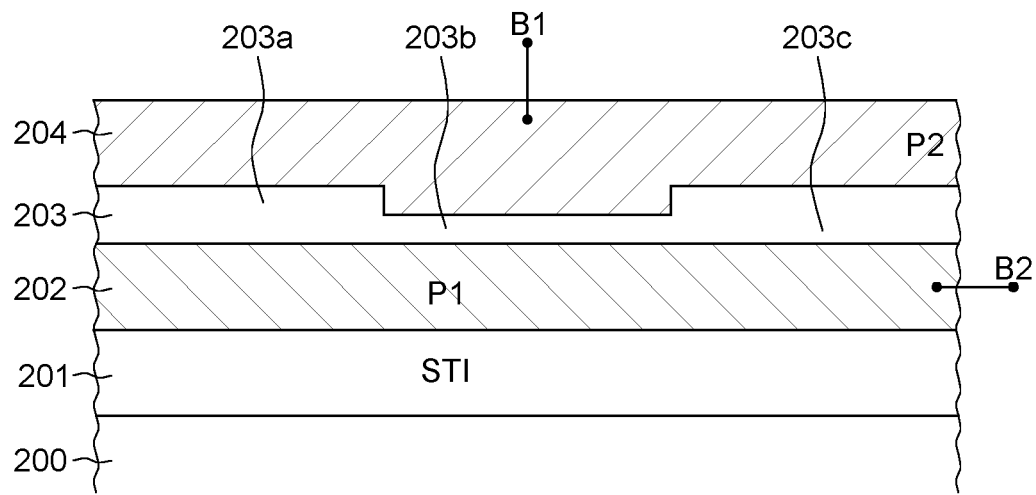
FIG. 4 shows a charge flow element.

FIG. 4 shows one exemplary embodiment of the charge flow element C3 such as described in the French Patent application publication number 2,981,190 (incorporated by reference).

The element C3 is formed from a semiconductor substrate 200, for example made of silicon, onto which an insulating layer 201 is deposited, for example of silicon oxide of the Shallow Trench Isolation (STI) type.

On top of this layer 201 is a first level of polycrystalline silicon P1 comprising a lower electrode 202 and a connection contact B2. The electrode 202 is coated with a dielectric layer 203 comprising a oxide-nitride-oxide dielectric stack for example of the ONO (silicon oxide—silicon nitride— silicon oxide) type at least one region of which 203*b* is thinner than the other regions 203*a* and 203*c* of the layer 203, and designed to allow charges to flow by tunnel effect.

The layer 203 is covered by a second level of polycrystalline silicon P2 comprising an upper electrode 204 and a connection point B1.

The thickness of the dielectric regions 203*a*, 203*b* and 203*c* of the layer 203 determines the time for discharging the storage capacitive element C1.

Those skilled in the art will be able to adjust the thickness of the regions of the layer 203 according to the value of the capacitance of the elements C1 and C2 and of the charge voltage of the element C1 delivered by the control circuit PWR in such a manner that the voltage $V_{GS}$ is higher than the threshold Vthreshold for the duration $T_0$ then lower than the threshold Vthreshold for a duration $T_0$ plus $T_{CH}$.

Figure 5:
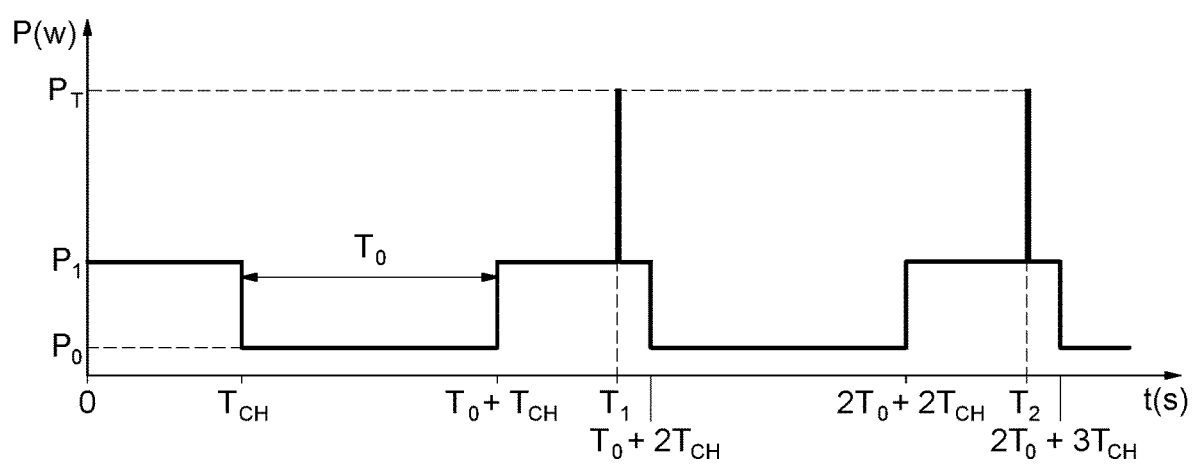
FIG. 5 illustrates power consumption of the system as a function of time.

FIG. 5 illustrates one exemplary embodiment of the device DISP illustrating the power consumption P of the system SYS as a function of time t.

It is assumed that the storage element C1 is discharged at the initial time, in other words at t equal to 0. The voltage $V_{GS}$ is lower than the Vthreshold, the transistor T is conducting and the source BATT supplies the system SYS.

In a first step for charging the storage capacitive element C1 by the power supply source BATT, of duration $T_{CH}$, the control circuit PWR charges the storage capacitive element C1 by applying the charge voltage $V_{CH}$ higher than the threshold Vthreshold, for example a voltage of 12 volts. The potential Vcc is for example ground.

During this step, the storage capacitive element C1 is partially discharged through the charge flow capacitive element C3. This partial discharge leads to an increase in the time $T_{CH}$ to reach the threshold Vthreshold.

According to another possible embodiment, in order to charge the element C1, the potential on the terminal Ec and the potential Vcc can respectively take positive and negative values with respect to ground GND, for example +6 volts and −6 volts, respectively.

During this step, the source BATT delivers a power P1 equal for example to a few milliwatts to the system SYS.

In a second step for disconnection of the electrical power supply source BATT, when the value of the voltage $V_{C1}$ across the terminals of the storage capacitive element C1 is higher than the threshold Vthreshold at the time $T_{CH}$, the transistor T is turned off. The source BATT is electrically disconnected from the system SYS except for the remaining leakage current $I_{OFF}$ of the transistor T. As a consequence, the source BATT delivers a power P0 to the system SYS corresponding to the current $I_{OFF}$ and lower than the nominal power for supplying the system SYS.

The system SYS is no longer powered and is in standby mode. The element C1 is no longer supplied by the means PWR.

The power consumption P0 of the system SYS is reduced to a few tenths of microwatts.

Then, in a step for discharging the storage capacitive element C1, the storage element C1 is discharged in a controlled manner through the charge flow element C3.

The charge voltage $V_{CH}$, the capacitances of the capacitive elements C1, C2 and C3, and the transistor threshold voltage T have been dimensioned in such a manner that the voltage $V_{C1}$ across the terminals of the element C1 is lower than the threshold Vthreshold at the end of a period $T_1$ starting from the discharge step, in other words at the time $T_0$ plus $T_{CH}$.

In a step for re-connection of the electrical power supply source when the value of the voltage $V_{C1}$ across the terminals of the storage capacitive element C1 is lower than the threshold Vthreshold, at the time $T_0$ plus $T_{CH}$, the transistor T is conducting. The source BATT is electrically re-connected to the system SYS. The source BATT delivers a power P1 to the system SYS.

When the storage capacitive element C1 is completely discharged through the charge flow capacitive element C3, the control circuit PWR charges the storage capacitive element C1 by applying the voltage $V_{CH}$.

During this period, the system is in reception mode, and receives, for example, instructions for measuring a pressure.

At the time $T_1$, the system SYS goes into transmission mode and transmits the value of the pressure measurement. At this time, the system SYS consumes a power $P_T$, for example of a few watts. The duration of transmission is very short with respect to the duration $T_{CH}$.

When the value of the voltage $V_{C1}$ across the terminals of the storage capacitive element C1 is higher than the threshold Vthreshold at the time $T_0$ plus twice $T_{CH}$, the transistor T is turned off and a new cycle begins.

The duration $T_0$ is adjusted according to the use of the system SYS.

For a given configuration of elements C1, C2 and C3, the duration $T_1$ is adjustable by modifying the charge voltage of the capacitive element C1. The processing unit 20 is configured for modifying the charge voltage.

According to another embodiment, the duration $T_0$ is modifiable by modifying the threshold voltage $V_{GS}$ of the transistor T, notably by biasing the transistor T.

According to another embodiment, the duration $T_0$ is modifiable by replacing the charge flow capacitive element C3 with a network of switched charge flow capacitive elements.

The processing unit 20 comprises an adjustment circuit MA for connecting in series the switched charge flow capacitive elements. The higher the number of elements connected in series, the longer will be the duration $T_0$.

It goes without saying that the processing unit 20 can force the continuous operation of the system SYS, in other words control the control circuit PWR in such a manner that the voltage $V_{C1}$ remains below Vthreshold.

Advantageously, no clock is required for timing the duration $T_0$ and re-starting the system at the end of this duration.

The device DISP disconnects the electrical power supply source BATT from the system SYS during the standby phase of duration $T_0$ considerably reducing the power consumption of the system SYS. The device thus forms a "pseudo" clock signal generator whose pulses have a duration $T_{CH}$ and are separated by $T_0$.

Furthermore, a charge flow capacitive element C3 has been described hereinabove that allows a partial discharge of the storage capacitive element C1 during the charging step. The charge flow capacitive element C3 could also have been disconnected during the charging step and the element C3 re-connected during the discharge step.

The invention claimed is:

1. A method for switching a system supplied by an electrical power supply source into standby mode, comprising:
a) charging a storage capacitive element by a charge voltage obtained from a voltage delivered by the electrical power supply source;
b) switching the system into standby mode by decoupling the system from the electrical power supply source in response to a value of a voltage across terminals of the storage capacitive element rising to a level that is higher than a threshold that is lower than the charge voltage;

c) discharging the storage capacitive element for a discharge period in such a manner that the value of the voltage across the terminals of the storage capacitive element falls to become lower than the threshold; and d) re-coupling the electrical power supply source to the system at the end of the discharge period.

2. The method according to claim 1, further comprising adjusting the discharge period.

3. The method according to claim 2, wherein adjusting the discharge period comprises adjusting the charge voltage.

4. The method according to claim 2, wherein discharging the storage capacitive element is carried out via a charge flow capacitive element and wherein adjusting the discharge period comprises adjusting a capacitive value of the charge flow capacitive element.

5. The method according to claim 1, wherein discharging of the storage capacitive element is carried out via a charge flow capacitive element and further comprising partially discharging the storage capacitive element through the charge flow capacitive element in step a).

6. The method according to claim 1, further comprising cyclically executing the steps a) to d).

7. An electronic device configured to switch a system, supplied by an electrical power supply source, into standby mode, comprising:

a charging input configured to be coupled to a charge voltage obtained from a voltage delivered by the power supply source;

a first input configured to be coupled to the power supply source;

a power supply output configured to be coupled to the system;

a storage capacitive element coupled to the charging input and configured to be charged by the charge voltage;

a switching circuit coupled between the first input and the power supply output and configured to decouple the power supply output from the first input in response to a value of the voltage across the terminals of the storage capacitive element rising to a level that is higher than a threshold which is lower than the charge voltage; and a discharge circuit configured to discharge the storage capacitive element for a discharge period in such a manner that the value of the voltage across the terminals of the storage capacitive element falls to become lower than the threshold;

wherein the switching circuit is further configured to re-couple the first input to the power supply output at the end of the discharge period.

8. The device according to claim 7, wherein the discharge circuit comprises a charge flow capacitive element coupled between a first terminal of the storage capacitive element and a ground.

9. The device according to claim 8, further comprising an initialization capacitive element coupled between a first terminal of the storage capacitive element and the charging input.

10. The device according to claim 7, wherein the switching circuit comprises a depletion-mode transistor having a gate receiving the voltage at the first terminal of the storage capacitive element, a source coupled to the power supply source and a drain coupled to the output of device, the threshold being equal to a threshold voltage of said depletion-mode transistor.

11. The device according to claim 10, wherein the depletion-mode transistor comprises a PMOS transistor.

12. An electronic circuit, comprising:

a power supply source;

a system configured to be supplied by the power supply source; and an electronic device configured to switch the system into standby mode, comprising:

a charging input configured to be coupled to a charge voltage obtained from a voltage delivered by the power supply source;

a first input configured to be coupled to the power supply source;

a power supply output configured to be coupled to the system;

a storage capacitive element coupled to the charging input and configured to be charged by the charge voltage;

a switching circuit coupled between the first input and the power supply output and configured to decouple the power supply output from the first input in response to a value of the voltage across the terminals of the storage capacitive element rising to a level that is higher than a threshold which is lower than the charge voltage; and a discharge circuit configured to discharge the storage capacitive element for a discharge period in such a manner that the value of the voltage across the terminals of the storage capacitive element falls to become lower than the threshold;

wherein the switching circuit is further configured to re-couple the first input to the power supply output at the end of the discharge period.

13. The circuit according to claim 12, further comprising an adjustment circuit configured to adjust the discharge period.

14. The circuit according to claim 12, wherein the discharge circuit comprises a charge flow capacitive element coupled between a first terminal of the storage capacitive element and a ground.

15. The circuit according to claim 14, further comprising an adjustment circuit configured to adjust a capacitive value of the charge flow capacitive element.

16. The circuit according to claim 12, further comprising a control circuit configured to cyclically activating the charging of the storage capacitive element.

17. The circuit according to claim 12, wherein the system is a connected autonomous wireless system.

18. The circuit according to claim 7, wherein the switching circuit comprises a depletion-mode transistor having a gate receiving the voltage at the first terminal of the storage capacitive element, a source coupled to the power supply source and a drain coupled to the output of electronic device, the threshold being equal to a threshold voltage of said depletion-mode transistor.

19. The device according to claim 18, wherein the depletion-mode transistor comprises a PMOS transistor.

20. The method of claim 1, further comprising applying the voltage across terminals of the storage capacitive element to a control terminal of a transistor switch connected between the electrical power supply source and the system wherein b) switching occurs in response to the voltage across terminals of the storage capacitive element rising to cause a turn off of the transistor switch and d) re-coupling occurs in response to the voltage across terminals of the storage capacitive element falling to cause a turn on of the transistor switch.

* * * * *